United States Patent [19]

Azuma et al.

[11] 4,256,710
[45] Mar. 17, 1981

[54] PROCESS FOR DEODORIZATION

[75] Inventors: Kenkoku Azuma; Akira Ikeda, both of Amagasaki, Japan

[73] Assignee: Mitsubishi Denki Kabushiki Kaisha, Tokyo, Japan

[21] Appl. No.: 79,196

[22] Filed: Sep. 26, 1979

[30] Foreign Application Priority Data

Nov. 1, 1978 [JP] Japan .................... 53/134906

[51] Int. Cl.³ .................................................. B01D 53/34
[52] U.S. Cl. .................................. 423/210; 423/224; 423/243; 423/245; 423/473; 422/4; 422/5; 422/37
[58] Field of Search ............... 423/210, 224, 243, 245, 423/472, 473, 581; 210/632; 422/4, 5, 37

[56] References Cited

U.S. PATENT DOCUMENTS

| 1,542,928 | 6/1925 | Wolff ............................ 423/473 |
| 1,961,878 | 6/1934 | Gilkey .......................... 423/581 X |
| 2,580,809 | 1/1952 | Marks et al. .................. 210/632 |

OTHER PUBLICATIONS

Kobayashi et al., "Deodorization of Discharged Gas from Sewage and Septic Disposal Plant", Report of 141st Meeting of Sewage Research, 3 pages

*Primary Examiner*—Earl C. Thomas
*Attorney, Agent, or Firm*—Oblon, Fisher, Spivak, McClelland & Maier

[57] ABSTRACT

A gas containing bad smell substances and a washing solution for deodorization are fed into a wash tower so as to carry out the deodorization by the gas-liquid contact. An aqueous solution of an alkali bromide and an ozone-containing gas are fed into a bubbling vessel to produce in active bromine oxide compound. The solution containing the active bromine oxide compound is added to the washing solution and the bad smell gas is washed with the washing solution in the wash tower. The effect of deodorization is improved by the function of the bromine oxide compound and an amount of ozone discharged out of the system is decreased.

11 Claims, 3 Drawing Figures

PROCESS FOR DEODORIZATION

BACKGROUND OF THE INVENTION

1. Field of the Invention

The present invention relates to a process for deodorization of a bad smell gas. More particularly, it relates to a process for deodorization using a combination of ozone and a wet washing device.

2. Description of the Prior Art

Heretofore, the system shown in FIG. 1 has been used for the conventional ozone deodorization.

In FIG. 1, the reference numeral (1) designates a bad smell gas; (2) designates a wash tower for washing the bad smell gas (1) with water; (3) designates a washing solution stored in the wash tower (2); (4) designates a pump for sucking the washing solution (3) to form a mist (5) in the wash tower (2); (6) designates a demister placed at the upper part of the wash tower (2); (7) designates a duct for feeding the gas (1) which is washed with water through the demister (6), into a detour type ozone reactor (8); (9) designates an ozonizer; (10) designates a diffuser for uniformly mixing the gas (1) in the duct (7) with an ozone-containing gas (11) obtained in the ozonizer (9) and the diffuser is connected to the duct (7) and (12) designates a treated gas which is deodorized in the system.

The operation of the system will be described.

The gas (1) is fed into the wash tower (2) wherein water soluble bad smell substances contained in the gas (1) are absorbed into the washing solution (3) as the mist (5) to be removed. Then, the bad smell gas (1) is passed through the demister (6) to remove the mist entrained in the gas (1) and it is fed to the duct (7). The washed gas (1) is uniformly mixed, in a moment, with the ozone-containing gas diffused from the diffuser (10) placed in the duct (7) and the mixed gas is fed into the ozone reactor (8). The mixed gas is passed through the detour passage in the ozone reactor (8) for a residence time of from at least several second to 1 minutes and the gas (1) is discharged as the deodorized gas (12).

The deodorizing system for the conventional deodorizing process has said structure whereby bad smell substances which can be removed by a water washing such as ammonia, lower fatty acid and lower amines are highly removed depending upon the washing condition. In the ozone reactor (8), the bad smell substrates such as nitrogen oxides methyl sulfide and dimethylamine which are reactable with ozone, are removed. However, bad smell substances such as hydrogen sulfide, methyl mercaptan and aromatic hydrocarbons have their reaction velocity constants of less than $10^5$ liter/mol.min. In the concentration of less than the ppm odor, their reactivities to ozone are remarkably low whereby most of the unreacted bad smell substances are discharged out of the system. The ozone-containing gas (11) added to the gas (1) is also discharged as the unreacted gas with the treated gas (12).

In the conventional ozone deodorizing process, the deodorizing effect for the other bad smell substances which are different from ozonizable substances such as ammonia, and the unreacted ozone is disadvantageously discharged. Moreover, the washing solution which contains water soluble bad smell substances absorbed by recycling through the wash tower, is directly discharged or is discharged after a dilution. The water containing bad smell substances is drained. This is not a satisfactory deodorization. The discharged water can be further deodorized before the drainage. However, the other apparatus must be connected and this increase the cost for the treatment.

SUMMARY OF THE INVENTION

It is an object of the present invention to provide a process for deodorization with ozone in which a small amount of a bromide is added to the washing solution and an ozone bubbling is applied for the washing solution to result high deodorizing effect and to prevent the discharge of the unreacted ozone.

The foregoing and other objects of the present invention have been attained by providing a step of feeding an aqueous solution of an alkali bromide and an ozone-containing gas into a bubbling vessel; a step of bubbling the ozone-containing gas into the aqueous solution of an alkali bromide in the bubbling vessel to obtain a solution containing an active bromine oxide compound (hypobromite); and a step of feeding the solution containing an active bromine oxide compound into a wash tower for washing the bad smell gas to carry out the deodorization by contacting them.

DETAILED DESCRIPTION OF THE PREFERRED EMBODIMENT

Figure 2:
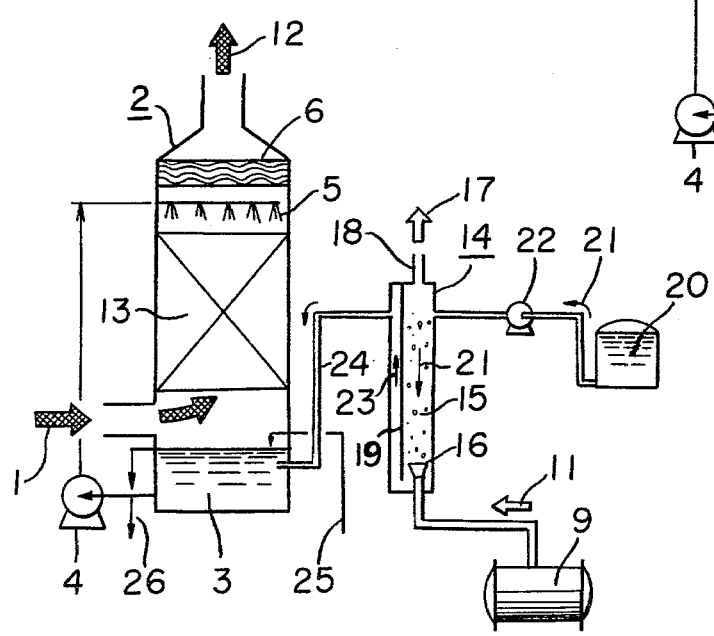
FIG. 2 is a diagram of a system of one embodiment of the present invention.

Referring to FIG. 2, one embodiment of the present invention will be illustrated.

In FIG. 2, the reference numeral (1) designates a bad smell gas; (2) designates a wash tower; (13) designates a packing layer packed in the wash tower (2) and a plastic packing of tellerettes, nets or rings made of a plastic such as polyvinyl chloride and polyethylene is packed in a height of 1 to 2 m; (14) designates an ozone bubbling vessel; and a bubbling pipette (16) for forming fine bubbles of the ozone-containing air (11) fed from the ozonizer (9) is placed at the lower part of the ozone-bubbling vessel (14) and a duct (18) through which the bubbled discharged gas (17) is discharged is placed at the upper part of the ozone bubbling vessel (14) and a partition (19) for forming passages is placed in the ozone bubbling vessel (14). The reference numeral (20) designates a make-up solution tank for storing a make-up solution (21) for washing which contains an alkali bromide such as sodium bromide or potassium bromide; (22) designates a pump for feeding the make-up solution (21) into the ozone-bubbling vessel (14); (23) designates a make-up solution which is activated by the gas-liquid contact of the ozone-containing gas (11) with the bubble (15) in the ozone bubbling vessel (14) and the make-up solution (23) is fed through a pipe (24) into the wash tower (2); (25) designates a fresh water fed into the wash tower (2) and (26) designates an overflow solution.

The operation of the process will be illustrated.

The ozone-containing gas (11) fed into the ozone bubbling vessel (14) is bubbled as fine bubbles (15) having diameters of 2 to 4 mm through the bubbling pipette (16) to result the gas-liquid contact with the make-up solution (21). Thus, ozone in the bubbles (15) reacts with the bromide (MBr) in the make-up solution (21) as the following reaction formula so as to result hypobromite (MBrO) wherein M represents Na, K or Li.

$$MBr + O_3 \rightarrow MBrO + O_2$$

The make-up solution (23) containing hypobromite (MBrO) which is formed by the gas-liquid contact with the ozone-containing gas (11) in the ozone bubbling vessel (14) is added, at a predetermined ratio to the washing water (3) at the bottom of the wash tower (2). Thus, the washing solution (3) containing the make-up solution (23) is sprayed from the upper part of the wash tower (2) as sprayed water (5) by the pump (4) and is passed through the packing layer (13) so as to be recycled. On the other hand, the gas (1) fed into the wash tower (2) is brought into contact with the washing solution (3) remained on the packing layer (13) whereby the bad smell substances contained in the gas (1) are immediately oxidized to be decomposed and the treated gas (12) is discharged through the top of the wash tower (2).

The deodorization reaction of the gas with the hypobromite (MBrO) has not been confirmed by a quantative analysis. However, according to the result of an analysis of the products and the change of pH of the washing solution (3), it is estimated to result the following deodorization reactions.

(a) Ammonia is oxidized to form nitrogen and the hypobromite is converted to the alkali bromide.

$$2NH_3 + 3MBrO \rightarrow N_2 + 3MBr + 3H_2O$$

(b) Hydrogen sulfide is oxidized to form sulfate or sulfur.

$$H_2S + 4MBrO \rightarrow SO_4^{--} + 4Br^- + 2H^+ + 4M^+$$

$$H_2S + MBrO \rightarrow MBr + S + H_2O$$

(c) Methyl mercaptan and methyl sulfide are oxidized to form methanesulfonic acid.

$$CH_3SH + 3MBrO \rightarrow CH_3SO_3H + 3MBr$$

$$(CH_3)_2S_2 + 5MBrO + H_2O \rightarrow 2CH_3SO_3H + 5MBr$$

(d) Methyl sulfide is oxidized to form dimethylsulfonic acid.

$$(CH_3)_2S + MBrO \rightarrow (CH_3)_2SO + MBr$$

(e) Trimethylamine is oxidized to form trimethyloxamine.

$$(CH_3)_3N + MBrO \rightarrow (CH_3)_3NO + MBr$$

These reactions are immediately carried out to give the reaction velocity constances of higher than $10^9$ liter/mol.min.

In the operation for treating the gas (1), a part of the washing solution such as 1 to 3 wt.% (based on the gas (1)) of the washing solution (3) is discharged as the overflow solution (26) out of system in order to prevent excess accumulation of the products formed by the deodorization reaction such as sulfate, sulfur and sulfonic acids in the washing solution (3).

The equal amount of the fresh water (25) is fed to balance to the overflow solution (26) and the steam discharged entrained in the treated gas. The ratio of the fresh water is about 1.3 to 3.5 wt.% based on the gas (1).

The rate of the ozone fed into the ozone bubbling vessel (14) should be higher than the rate required for maintaining the concentration of $BrO^-$ in the washing solution (3) to at least 0.10 g./liter preferably 0.28 to 0.65 g./liter. When the concentration of $BrO^-$ is lower than 0.10 g./liter, the ability for removing methyl disulfide and methyl mercaptan contained in the gas (1) is too low. On the contrary, when it is higher than 0.65 g./liter, the content of $BrO^-$ discharged in the overflow solution (26) is too much. When the bad smell is removed in a sewage treating factory, the ratio of the ozone can be in a range of about 4 to 15 ppm by volume based on the gas (1).

In the packing layer (13) of the wash tower (2), the packing is packed in a height of 1 to 2 m, and the gas (1) is passed through the packing layer (13) at a superficial velocity of 1.0 to 1.8 m/sec. The rate of the washing solution (3) passed through the packing layer (13) in counter-current to the flow of the gas (1) is preferably higher for the increase of the effect of deodorization, but it is in a range of 0.5 to 2.0 times by weight based on the gas (1) in view of the operation cost.

The unreacted ozone is included in the discharge gas (17) discharged through the duct (18) at the top of the ozone bubbling vessel (14). Thus, the rate of the discharged gas (12) and the content of the unreacted ozone are small and accordingly, ozone can be easily decomposed by passing through a layer of an ozone-decomposing catalyst such as active carbon and metal oxide catalyst. The gas which does not contain ozone can be discharged out of the system. In the conventional process, the unreacted ozone contained in the treated gas (12) discharged from the ozone reaction chamber (8) could be removed with the ozone-decomposing catalyst in principle. However, the rate of the treated gas (12) discharged through the ozone bubbling vessel (14) in the conventional process is more than about 1000 times of that in the present invention and the content of ozone in the treated gas (12) in the conventional process is more than 10 times of that in the present invention. Accordingly, it is not easy to remove the unreacted ozone in the conventional process in the practical operation.

When the alkali bromide is included in the make-up solution and it is added to the washing solution (3), ozone rapidly reacts with the alkali bromide and a dissolved ozone is not substantially remained in the washing solution and the unreacted ozone is not included in the treated gas (12), discharged out of the system.

Figure 1:
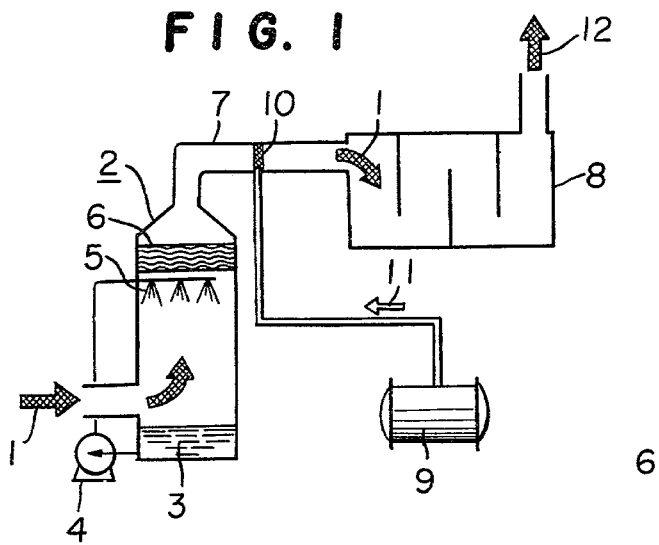
FIG. 1 is a diagram of a system of for the conventional process for deodorization.
Figure 3:
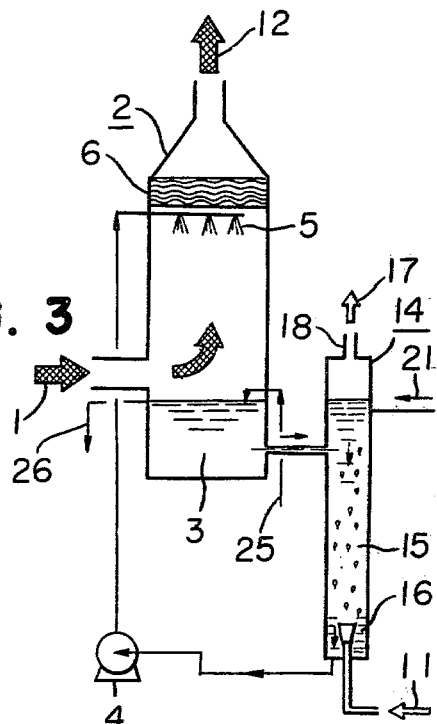
FIG. 3 is a diagram of a system of the other embodiment of the present invention.

FIG. 3 shows a diagram of the system of the other embodiment of the present invention. The washing solution (3) recycled through the wash tower (2) to react with the bad smell gas (1) is fed to the top of the ozone bubbling vessel (14). Hypobromite ion $BrO^-$ in the washing solution in the wash tower (2) reacts with the bad smell gas (1) to form bromide ion $Br^-$. The washing solution containing $Br^-$ is brought into the gas-liquid contact with the ozone-containing gas (11) in the ozone bubbling vessel (14) to be oxidized to convert $Br^-$ into $BrO^-$ and the washing solution is recycled as the spraying solution (5) to the top of the wash tower (2). In accordance with the system having the above-mentioned structure, bad smell substances or organic compounds dissolved in the washing solution (3) and sodium bromide and its reaction products are oxidized with ozone in the oxizone bubbling vessel (14) to be non-noxious compounds.

Certain experiments for deodorization effects using the apparatus for the deodorization of the present invention will be illustrated.

The conditions in the experiments are as follows.

Bad smell gas

Bad smell gas of air containing hydrogen sulfide, methyl mercaptan, methyl sulfide and methyl disulfide at ratios of 7.3 to 10.2 ppm respectively at 18° to 21° C.

Wash tower

Glass column having an inner diameter of 65 mm in which ceramic Raschig rings having ¼ inch are packed in a height of 500 mm;
Bad smell gas fed at a rate of 50 liter/min.
Recycling solution fed at a rate of 150 ml./min.
Fresh water fed at a rate of 3 ml./min.
pH of the recycling solution of 8.0–8.9.

Ozone bubbling vessel

Glass cylindrical column having an inner diameter of 55 mm and a depth of the solution of 750 mm.

Make-up solution

Aqueous solution containing 8.1 g./liter of $BrO^-$ prepared by feeding 750 liter of air containing about 6800 ppm of ozone into an aqueous solution containing 20 g./liter of sodium bromide.

Control of concentration of $BrO^-$

The feeding speed of the make-up solution is controlled.

The concentrations and the removal percents of the bad smell substances at the outlet of the wash tower to the variation of the concentration of $BrO^-$ in the recycling washing solution are shown in the following table.

$$\frac{(\text{Concentration at inlet} - \text{Concentration at outlet})}{\text{Concentration at inlet}} \times 100\%$$

The concentrations of $BrO^-$ were analyzed by the KI-$Na_2S_2O_3$ titration. The concentration of ozone was measured by the non-dispersion ultraviolet absorption type ozone actinometer (commercially available) and the bad smell substances were analyzed by the flame photometry type gas chromatography (commercially available).

TABLE

| Concentration and removal percent to variation of concentration of $BrO^-$: | | | | | |
|---|---|---|---|---|---|
| Concentration of $BrO^-$ (mg/liter) | | | | | |
| Kinds of bad smell substances and concentrations (ppm) | 0 | 30 | 70 | 130 | 300 |
| $H_2S$ 9.2 ppm | 8.7 ppm (5%) | 3.7 ppm (60%) | 0.30 ppm (97%) | Nil (100%) | Nil (100%) |
| $CH_3SH$ 9.5 ppm | 9.2 ppm (3%) | 3.7 ppm (61%) | 0.48 ppm (95%) | 0.19 ppm (98%) | Nil (100%) |
| $CH_3SCH_3$ 10.2 ppm | 10.2 ppm (0%) | 5.5 ppm (46%) | 1.8 ppm (82%) | 0.31 ppm (97%) | Nil (100%) |
| $CH_3SSCH_3$ 7.3 ppm | 7.3 ppm (0%) | 5.8 ppm (21%) | 4.2 ppm (42%) | 1.7 ppm (77%) | 0.41 ppm (94%) |

In accordance with the process of the present invention, the bad smell gas is treated with the hypobromite obtained by bubbling an ozone-containing gas into an aqueous solution of an alkali bromide. The effect of deodorant is remarkably improved and the completely treated gas can be discharged out of the system and the unreacted ozone is not discharged out of the system.

We claim:
1. A process for deodorization of a gas containing bad smell substances comprising bubbling an ozone-containing gas through an aqueous solution of an alkali bromide in a bubbling vessel, to obtain a washing solution containing from about 0.10 g per liter to about 0.65 g per liter $BrO^-$ and contacting the gas with the washing solution in a wash tower.

2. A process for deodorization according to claim 1 wherein said washing solution is stored in said wash tower and a part of said washing solution is discharged and replaced with fresh washing solution.

3. A process for deodorization according to claim 2, wherein the amount of washing solution discharged is from 1 to 3 wt% based on said bad smell gas and the amount of fresh washing solution fed into the washing tower is from 1.3 to 3.5 wt% based on said bad smell gas.

4. A process for deodorization according to claim 1 wherein a plastic packing is packed in said wash tower.

5. A process for deodorization according to claim 4 wherein said plastic packing is tellerettes, nets or rings made of polyvinyl chloride or polyethylene.

6. A process for deodorization according to claim 1 wherein the rate of said washing solution fed into the wash tower for washing said gas, is from 0.5 2.0 times the rate of said bad smell gas fed into the wash tower.

7. A process for deodorization according to claim 1 wherein the concentration of $BrO^-$ in the washing solution is maintained within said concentrations by controlling the rate of said ozone-containing gas fed into said bubbling vessel.

8. A process for deodorization according to claim 1 where the concentration of $BrO^-$ in the washing solution is from about 0.28 g per liter to about 0.65 g per liter.

9. A process for deodorization according to claim 1 wherein the bubbling vessel is provided with a discharge passage for discharging gas therefrom, the discharge passage containing an ozone-decomposing catalyst.

10. A process for the deodorization of a gas containing bad smell substances comprising bubbling an ozone-containing gas through an aqueous solution of an alkali bromide in a bubbling vessel to obtain a washing solution containing from about 0.10 g per liter to about 0.65 g per liter $BrO^-$, contacting the gas with the washing solution in a wash tower, withdrawing wash solution which has contacted the gas, and recycling it through the bubbling vessel in admixture with the alkali bromide solution.

11. A process for deodorization according to claim 10 wherein the wash solution contains from about 0.28 g per liter to about 0.65 g per liter $BrO^-$.

* * * * *